May 31, 1960 — R. C. MOHR — 2,938,717
SLAG CAR CONSTRUCTION
Filed April 7, 1958
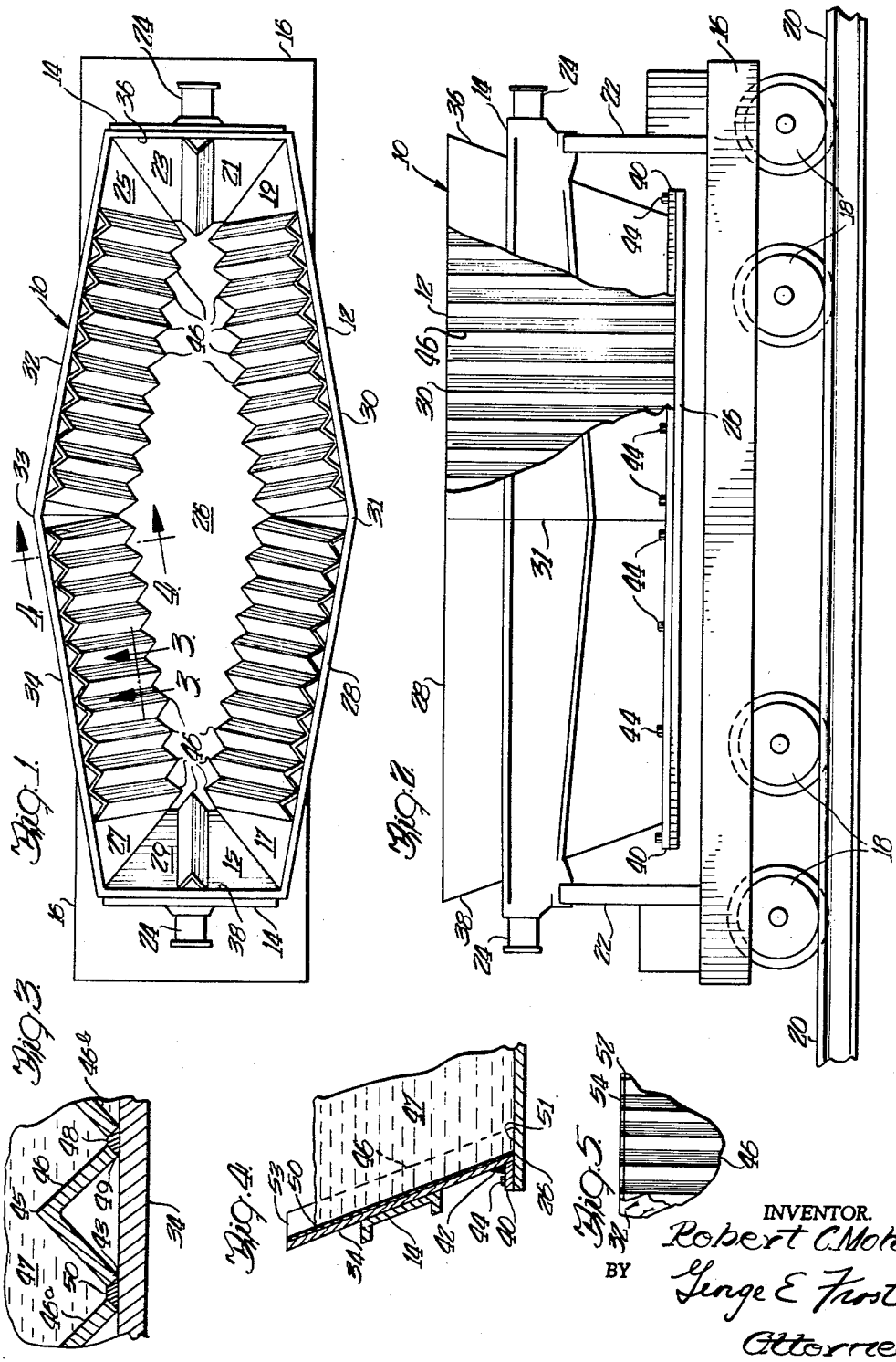
INVENTOR.
Robert C. Mohr
BY George E. Frost
Attorney

United States Patent Office 2,938,717
Patented May 31, 1960

2,938,717

SLAG CAR CONSTRUCTION

Robert C. Mohr, Chicago, Ill., assignor to John Mohr & Sons, Chicago, Ill., a corporation of Illinois Filed Apr. 7, 1958, Ser. No. 726,773

4 Claims. (Cl. 266—39)

The conventional slag car construction consists of a conical cast iron pot mounted on a railroad car. These pots are expensive because of the large tall castings required and are of limited capacity because of their circular cross-section. Also, slag hardening on the inside surfaces of these pots is difficult to remove and when not removed, the slag builds up in successive layers to reduce the capacity of the pot.

In accordance with the present invention the above difficulties are obviated by a slag car construction that requires no castings, is of shape utilizing the car shape most effectively, and by special construction the tendency of the slag to adhere to the car is minimized. A fabricated steel receptacle of substantially rectangular cross-section is mounted on a railroad car. The rectangular shape is of greater capacity for the same car width than the conical shape. Steel angle bars are welded to the inside faces of the sides and ends of the receptacle. These are adjacent each other, presenting a corrugated inside surface, and the welds extend along the entire length of each bar to provide maximum heat transfer to the sides and ends of the receptacle. The corrugated inside surface presents a greater heat transfer area to the molten slag than would be present in the absence of the angle bars. In addition, the angle bars give an irregular heat flow from the adjoining slag to cause differential cooling that tends to break the slag free.

If the angle bars are corroded or otherwise damaged they can be removed and new ones substituted. The sides and ends of the receptacle are sufficiently protected from the molten slag since they are substantially covered by the angle bars.

It is therefore a general object of the present invention to provide an improved slag car construction adapted to carry molten slag and rapidly and differentially cool the same.

It is another object of the present invention to provide an improved slag car construction in which a fabricated steel receptacle of generally rectangular cross section carries molten slag.

It is a further object of the present invention to provide an improved slag car construction in which a series of steel angle bars are affixed to the inside side and end surfaces of the receptacle and welded along their entire lengths to increase the cooling area and provide differential cooling.

It is yet another object of the present invention to provide an improved slag car construction in which a fabricated steel receptacle presents a corrugated inside surface having sharp dihedral angles against which the molten slag bears and is differentially cooled.

Yet another object of the present invention is to provide an improved slag car construction in which cooled slag is easily removed from the corrugated surfaces of the receptacle.

Still another object of the present invention is to provide an improved slag car construction in which a fabricated steel receptacle with corrugated sides and ends receives molten slag; rapidly cools the slag to minimize melting of the steel from the intense heat of the slag; differentially cools the slag to set up internal stresses in the slag which makes it relatively easy to break loose from the receptacle after it hardens; is readily manufactured from standard structural shapes; efficiently uses the available space; defines its own pouring spout; and is otherwise adapted for practical commercial use.

The novel features which I believe characteristic of my invention are set forth with particularity in the appended claims. My invention itself, however, both as to its organization and method of operation, together with further objects and advantages thereof, will be best understood by reference to the following description taken in conjunction with the accompanying drawings in which:

Figure 1 is a top plan view of a slag car construction constructed in accordance with the present invention;

Figure 2 is a side elevational view of the slag car construction of Figure 1 with parts broken away to show the interior;

Figure 3 is an enlarged fragmentary cross sectional view through section 3—3, Figure 1 and showing the car loaded with slag; and Figure 4 is a fragmentary cross-sectional view through section 4—4, Figure 2, and showing the car loaded with slag; and Figure 5 is a front elevational view like the broken away portion of Figure 2 of a modified form of the angle bars used in the apparatus of Figures 1–4.

There is shown generally at 10, Figures 1 and 2, a slag car construction adapted to carry molten slag made in accordance with the present invention. The slag car 10 comprises a steel receptacle 12, a carrier 14 into which the receptacle is fixedly received, a base 16, and railroad wheels 18 on which the base is mounted. The entire unit moves along rails 20.

Carrier 14 is mounted on upstanding supports 22 which are attached to the base by welding or any similar method (not shown). Trunnions 24 protrude from either side of carrier 14 and bear the entire weight of the slag car 10 when it is lifted to discharge the molten slag by crane means or otherwise (not shown).

The receptacle 12 is in the form of an elongated rectangle when seen from the top as in Figure 1. The lengthly sides, however, belly out or bulge to form pour spouts at 31 and 33, Figure 1. The sides and ends of the receptacle are in beveled conformation as shown, so that the shape defined is somewhat in the form of an inverted flat-sided truncated pyramid.

Referring now to Figures 1 and 2, receptacle 12 has a floor 26 made of steel plate in the form of an elongated hexagon conforming to the shape of the sides. Side plates 28, 30, 32 and 34 and end plates 36 and 38 extend upwardly and outwardly from the floor 12 as shown in Figure 4. At the bottom of the side and end plates, a ring 40 is welded at 42, Figure 4, to define a peripheral mounting flange for floor 26, which is bolted thereto by means of bolts 44. As shown in Figures 1, 2 and 4, the side plates and end plates define an obtuse angle in relation to the floor 26, thus forming a beveled construction.

As shown in Figure 1, side plates 28 and 34 and side plates 30 and 32 define planes meeting at a large angle to define apices at 31 and 33, which form pouring lips. A series of steel angle bars 46 is disposed along the inside surfaces of the side and end plates 28, 30, 36, 32, 34 and 38. These angle bars extend along the length and breadth of the inside faces of each side and end plate to substantially cover each face exposed to the molten slag. The six sides and ends of receptacle 12, as shown in Figure 1, define a corrugated inside surface against which the molten slag rests. The purpose of the corrugated construction will be explained in detail hereinafter.

Angle bars 46 are laid adjacent one another and are welded to the side and end plates along their entire lengths. As shown in Figure 3, for example, the spaced edges 43 and 49 of angle bar 46 are welded to side plate 34 as indicated at 48 and 50. It will be noted that the angle bar 46 is welded to side plate 34 along the entire length of its spaced edges 43 and 49 as shown in Figure 4. Angle bars 46a and 46b are also welded to side plate 34 at points 50 and 48, respectively. With this construction, the series of adjacent angle bars defines a corrugated inside surface.

As shown in Figure 4, the angle bars 46 are in upstanding relation to the floor 26. It will be noted that the bottom edge 51 of angle bar 46 received on floor 26 is beveled to fit flush against the floor. This is to prevent molten slag from leaking under edge 51. Also, the top edge 53 of each angle bar 46 is beveled to define a horizontal plane coextensive with the top edges of the sides and ends.

Angle bars 46 accelerate cooling of the molten slag 47 and provide differential cooling of the slag. Greater heat transfer area is defined by the angle bars 46 than would be present absent the bars. This greater area (and the increased rate of heat transfer) causes the molten slag 47 to cool more rapidly than otherwise would be the case.

The differential cooling occurs because of the corrugated surface defined by the angle bars 46. The slag 47 adjacent welds 48 and 50, Figure 3, is cooled rapidly because the heat transfer path to the adjacent side plate 34 is very short. The slag 47 adjacent apex 45 of angle bar 46, however, is cooled more slowly because the path of heat transfer to side plate 34 (extending the entire side spread of the angle bar and through the weld to the side plate) is relatively long. This provides a differential cooling effect by which the slag adjacent welds 48 and 50 cools more rapidly than the slag adjacent the apex 45. This differential cooling of the molten slag sets up internal stresses when the slag solidifies. These stresses make the slag relatively easy to break loose.

It will be noted that in the form shown, the sides and ends of the car define sloping triangular corners 15, 17, 19, 21, 23, 25, 27 and 29. These could be covered by angle bars having side and end surfaces cut to fit against each other within these corners. However, the heat transfer from the uncovered corners is sufficiently favorable—the corners are sufficiently irregular—that effective irregular cooling occurs to permit the slag to break free.

It will also be noted that the welds 48 and 50, Figures 3 and 4, extend the whole length of angle bars 46. This provides a maximum rate of heat transfer from the molten slag to the side and end plates.

As shown in Figure 5, the top ends of the angle bars 46 are preferably sealed by caps 54 welded at 52 to the top faces 53 of the bars 46. As shown in Figure 5, with this construction the top cap 54 is made flush with the top edge of the car. This construction serves to prevent the poured slag from entering into the space behind each angle bar.

If extended use of slag car 10 causes angle bars 46 and floor 26 to accumulate hardened slag or otherwise be permanently damaged, bars 46 can be removed and replaced with similar bars without otherwise altering the car. The side plates of receptacle 12 are protected from the molten slag by bars 46 and therefore are not damaged. Floor 26 is affixed to ring 40 by bolts 44, which may be removed to replace the floor.

While I have shown and described a specific embodiment of the present invention, it will of course be understood that various modifications and alternative constructions may be made without departing from the true spirit and scope of the invention. I therefore intend by the appended claims to cover all such modifications and alternative constructions as fall within their true spirit and scope.

What I claim as new and desire to secure by Letters Patent is:

1. A slag car construction adapted to receive molten slag and release the same without undue adhesion comprising in combination: a steel plate defining a floor; steel side and end plates affixed to and upstanding from the floor to define a receptacle; a series of upstanding steel angle bars affixed at their spaced edges to the inside faces of said side plates in close adjacent relation and in good heat transfer engagement with the adjacent side plate over the entire length of each angle bar, the angle bars each extending from the floor to the top edge of each side plate and covering substantially the entire surface of said inside faces to define a corrugated inside surface against which the molten slag rests, whereby the molten slag is rapidly cooled by the action of the angle bars and side plates and at the same time cooled differentially so that internal stress is set up in said slag to minimize adhesion to the angle bars.

2. A slag car construction adapted to receive molten slag and release the same without undue adhesion thereto comprising in combination: a steel plate defining a floor; steel side and end plates affixed to and upstanding from the floor to define a receptacle, said side and end plates each being at an angle to the floor to define a beveled conformation; a series of upstanding steel angle bars affixed at their spaced edges to the inside faces of said side plates in close adjacent relation and in good heat transfer engagement with the adjacent side plate over the entire length of each angle bar, the angle bars each extending from the floor to the top edge of each side plate and covering substantially the entire surface of said inside faces to define a corrugated inside surface against which the molten slag rests, whereby the molten slag is rapidly and differentially cooled by the action of said angle bars and side plates so that internal stress is set up in said slag to minimize adhesion to the angle bars.

3. A slag car construction adapted to receive molten slag and release same without undue adhesion thereto comprising in combination: a steel plate defining a floor in the form of an elongated hexagon with parallel ends and complementary bulging sides; steel side and end plates affixed to and upstanding from said floor to define a receptacle having centrally located pouring spouts, said side and end plates each being at an angle to the floor to define a beveled conformation; a series of upstanding steel angle bars affixed at their spaced edges to the inside faces of said side plates in close adjacent relation and in good heat transfer engagement with the adjacent side plate over the entire length of each angle bar, the angle bars each extending from the floor to the top edge of each side and end plate and covering substantially the entire surface of said inside faces to define a corrugated inside surface against which the molten slag is rapidly and differentially cooled by the action of said angle bars and side plates so that internal stress is set up in said slag to minimize adhesion to the angle bars.

4. A receptacle for transporting and dumping slag comprising: a frame; an outer shell mounted on said frame, said shell having side walls, an open top, and a bottom, the side walls of said shell being formed of a plurality of flat metal plates angularly disposed with respect to each other; and means forming an inner shell about at least a major portion of the side walls of said outer shell, said means comprising a plurality of elongated metallic members extending from the top to the bottom along the inner faces of the side walls of the outer shell, said members being positioned in juxtaposition to each other, and angularly with respect to each other and to said side walls, to define a corrugated inner surface, the inwardly edge of each member being connected to the inwardly edge of an adjacent member, the outwardly edge of each member being connected to the inner face of a side wall, whereby adjacent members secured at their inner edges define a generally triangular space between the members and the side wall to which they are affixed to insulate said inner edges from said sides except by heat transfer through the members, and the outer edges of the members connected to said side walls are in good heat transfer engagement with said side walls to provide differential cooling of said members and minimize adhesion of slag to said members.

References Cited in the file of this patent

UNITED STATES PATENTS

| | | |
|---|---|---|
| 2,022,372 | Hopkins | Nov. 26, 1935 |
| 2,205,940 | Astrom | June 25, 1940 |
| 2,311,501 | Zoldok | Feb. 16, 1943 |
| 2,335,781 | McFeaters | Nov. 30, 1943 |
| 2,406,380 | Johnston | Aug. 27, 1946 |